United States Patent Office 2,751,630
Patented June 26, 1956

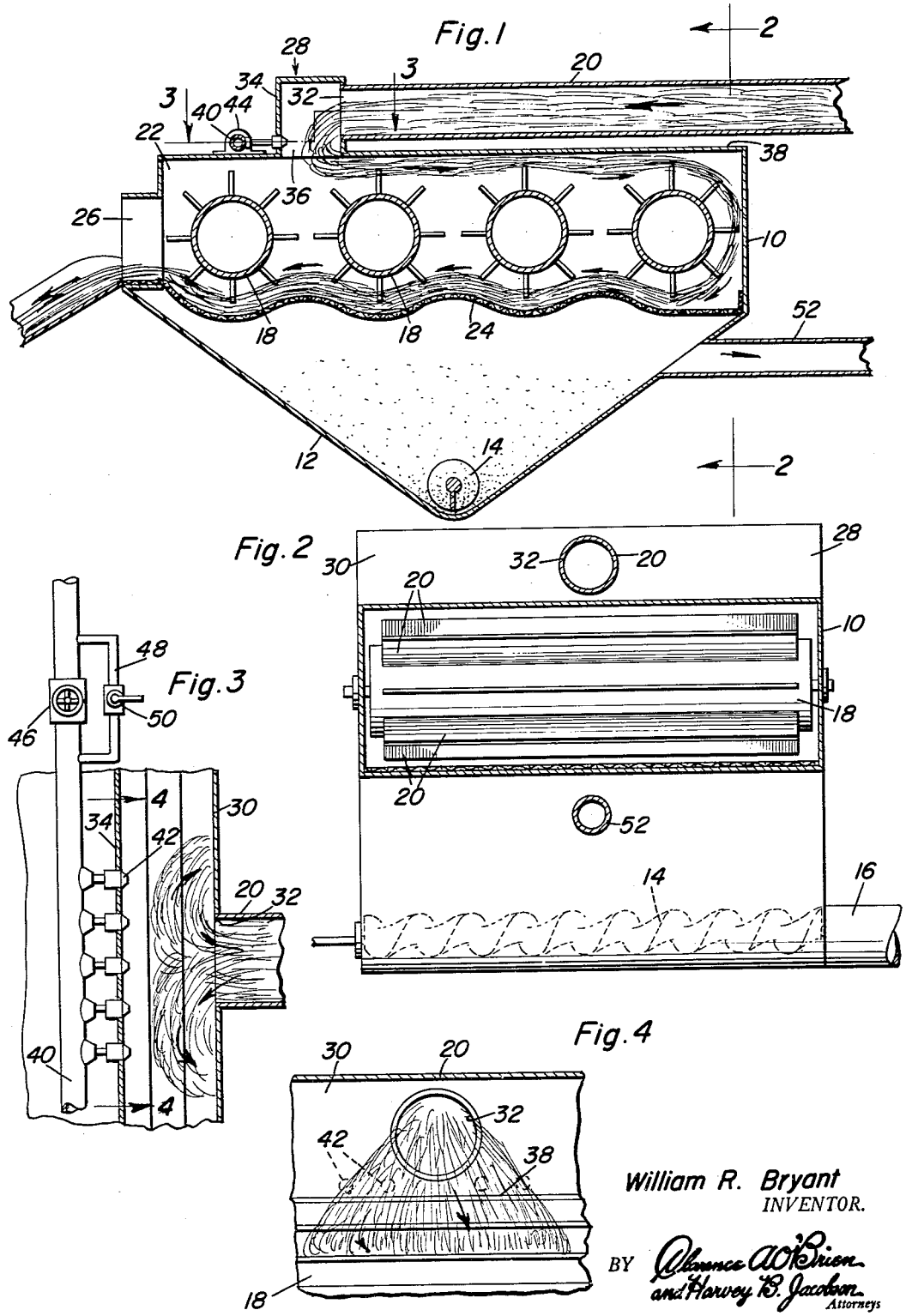

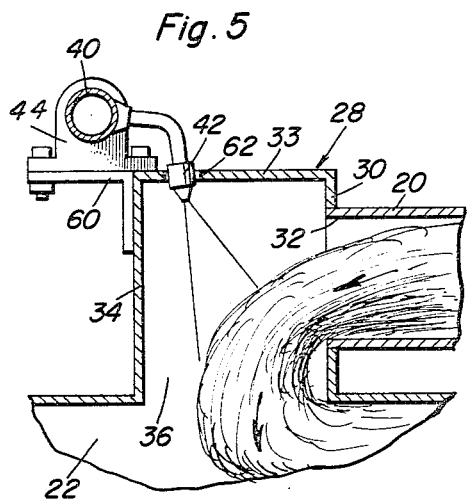
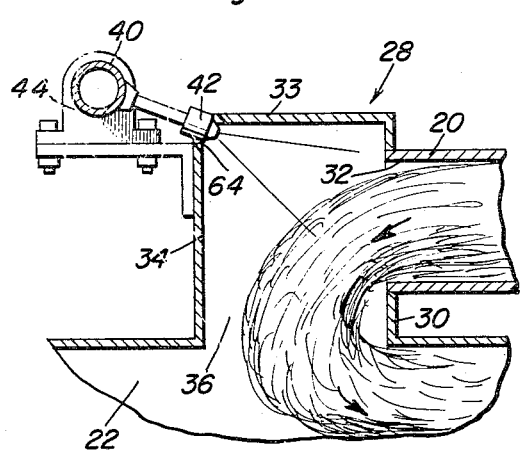
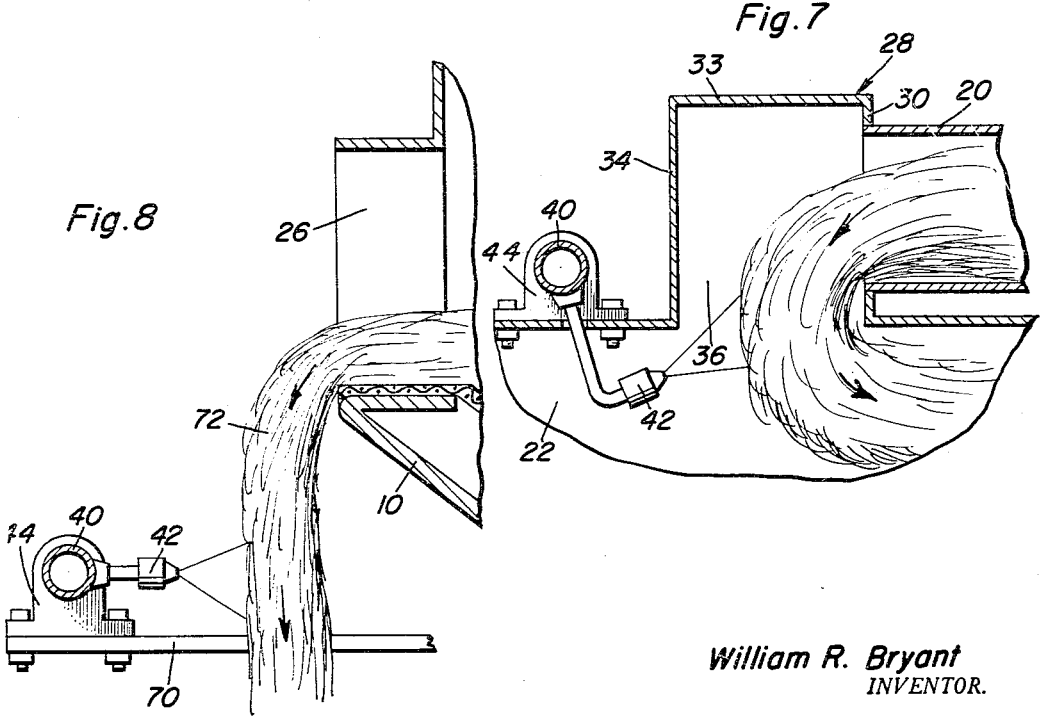
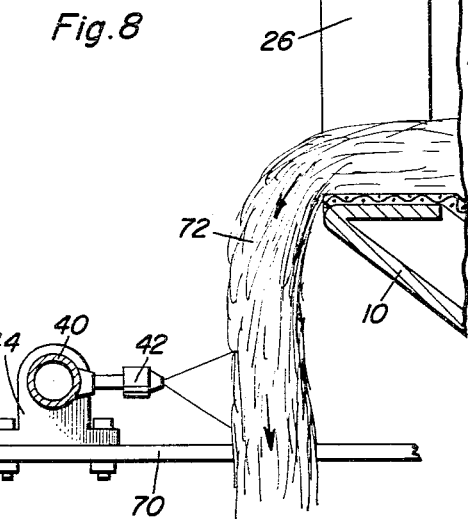
William R. Bryant
INVENTOR.

2,751,630

FIRE EXTINGUISHER AND STATIC ARRESTER SYSTEM FOR SEED COTTON PRECLEANER

William R. Bryant, Jonesboro, Ark.

Application March 14, 1955, Serial No. 494,151

11 Claims. (Cl. 19—66)

This invention constitutes a continuation-in-part of my prior co-pending application Serial No. 425,779, filed April 27, 1954, for an invention bearing the same title as that of the present application, and comprises novel and useful improvements in a fire extinguisher and static arrester system for seed cotton precleaners, and more specifically relates to a device for discharging controlled quantities of moisture into seed cotton entering the precleaner, in an improved manner for securing the precise and accurate control of the quantity of moisture introduced into the cotton, and for dissipating static charges upon the seed cotton for extinguishing fires in a precleaner.

Throughout this specification and claims the term moisture is used in its broadest sense being intended to include water in all forms, such as steam, fogs, atomized sprays and even liquid water; and to include other liquid treating agents.

It is generally recognized that a large proportion of the fires occurring in the equipment of cotton ginning plants originate in the drying and cleaning equipment thereof. It is also well known that the passing of the cotton fibers between and through the various cleaning and drying equipment of a ginning plant, especially when the fibers are in a thoroughly dried condition, tends to create static charges upon the fibers which greatly hamper the flow of the fibers and also detrimentally affect the performance of the fibers in the various fiber treating operation and equipment of the ginning plant.

It is therefore a primary object of this invention to provide a process and a means whereby the aforementioned detrimental objects, and which have been heretofore accepted as necessary evils by the cotton ginning industry, may be satisfactorily and completely overcome in a relatively simple and inexpensive manner.

It is a further specific object of the invention to provide a process and a means for treating seed cotton with moisture or other treating agents in a novel and highly improved manner in a seed cotton precleaner, in preparation for its passage through the gin stands, for overcoming the aforesaid detrimental conditions of conventional practice.

A still further object of the invention is to provide an improved process and means in conformity with the foregoing objects wherein the control of the moisture or treating agent applied to the seed cotton may be widely varied and precisely effected, to the end that an adequate supply of moisture or treating agent may be applied to attain the aforesaid objects; but wherein over moistening of the seed cotton may be safeguarded against.

A still further object of the invention is to provide a process and means whereby the aforesaid desired results and objects may be attained in a manner which will necessitate very little change in the structure of existing precleaners and in their modes of operation.

And a final important object of the invention to be specifically enumerated herein, resides in the provision of a process and a means whereby additional moisture may be imparted to the moisture content of seed cotton to improve the physical characteristics and the value of such seed cotton.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a somewhat diagrammatic view showing in vertical section a portion of a seed cotton precleaner and to which the principles of the present invention have been applied;

Figure 2 is a vertical transverse sectional view taken substantially upon the plane indicated by the section line 2—2 of Figure 1, the trash auger of the precleaner being shown in dotted lines therein;

Figure 3 is a horizontal sectional detail view, taken substantially upon the plane indicated by the broken section line 3—3 of Figure 1 and showing the manner in which the moisture spray nozzle assembly is positioned in the seed cotton air duct header for spraying the seed cotton as it passes from the duct into the cleaning chamber of the precleaner;

Figure 4 is a vertical transverse sectional detailed view taken substantially upon the plane indicated by the section line 4—4 of Figure 3 and showing the relative arrangement of the nozzle of the spraying assembly with respect to the flow of the stream of incoming seed cotton passing from the seed cotton air duct into the cleaning chamber of the precleaner;

Figure 5 is a view of the upper portion of Figure 1, but showing a modified arrangement of the moisture producing device, relative to the seed cotton through the header of the cleaner assembly;

Figure 6 is a view similar to Figure 5 but showing a still further modified arrangement of the moisture producing means;

Figure 7 is a view similar to Figure 5 but showing a still further modified arrangement and positioning of the moisture producing means; and Figure 8 is a fragmentary view from the left hand portion of Figure 1 showing a still further modified arrangement of the moistening means and wherein the moisture is introduced after the seed cotton leaves the precleaner in its flow toward the gin stands.

Referring specifically to the accompanying drawings, and in particular to the embodiment disclosed in Figures 1–4, it will be observed that the number 10 designates generally any conventional type of precleaner for seed cotton the same including a casing or housing having downwardly converging bottom walls 12, constituting a trough for receiving trash and foreign matter cleaned from the seed cotton as set forth hereinafter, and at the bottom of this trough there is conventionally disposed an auger or conveyor screw 14 which is also shown in dotted lines in Figure 2, operated in the usual manner and by means of which trash falling into the hopper 12 will be discharged from the bottom of the same by the auger as through a discharge duct 16.

Extending across substantially the entire length of the chamber in the upper portion of the casing of the precleaner 10 is a plurality of cleaning rollers, each of which is designated by the numeral 18 and which are disposed in generally parallel arrangement and are operated in any usual and conventional manner.

It will be observed that in accordance with the usual practice the cleaning rollers 18 are disposed in a generally parallel relation with respect to the auger 14, and these rollers are provided with the usual radially and longitudinally extending ribs or flights 20, see Figure 2, by means of which the seed cotton is passed from roller to roller with a tossing or beating operation whereby to shake and separate trash and foreign matter therefrom.

There is also provided the usual seed cotton air duct 20 by means of which the seed cotton is conveyed in a current of air from the drier, or from any other suitable source in a stream of cotton and air for delivery into the upper portion or cleaning chamber, indicated generally by the numeral 22, of the precleaner. In accordance with the usual practice there is provided a partition 24 in the form of a screen, whose surface is closely contoured to the bottom portions of the cleaning rollers 18 as shown clearly in Figure 1, in order that the stream of seed cotton delivered into the cleaning chamber may pass to one end of the cleaning chamber upon the upper portions of the cleaning rollers; may then pass downwardly about the end roller; and from thence may pass along the underside of the cleaning rollers and upon the top surface of the screen 24 to eventually be discharged through the discharge opening or outlet 26. From the outlet 26, the seed cotton may pass directly to the burr extractor, not shown, but forming a well known and conventional element of the cotton cleaning equipment of a ginning plant; and from thence may pass directly to the usual feeders of the gin stands, not shown, or alternatively could be discharged into a cotton moistening device of the character disclosed and claimed in my prior co-pending application Serial No. 419,783, filed March 30, 1954.

Customarily, the flow of seed cotton from the air duct 20 is directly discharged into the cleaning chamber 22, passing through the chamber as aforesaid as is indicated in Figure 1 of these drawings. In the present invention, however, a process and a means is provided whereby moisture may be applied to the seed cotton during its passage from the duct 20 into the cleaning chamber 22. For that purpose there is provided a header 28 which is preferably a housing of rectangular cross section and which extends longitudinally across substantially the entire width of the precleaner 10, as will be best apparent from Figure 2. In some instances, this housing may be a conventional element provided to connect the seed cotton duct 20 with the cleaning chamber 22; while in other instances the same may be operatively interposed between and connected to these elements in accordance with this invention. In any event, the air duct 20 usually communicates with the interior of the header or box 28 at a mid-portion of one side wall 30 of the same, by means of a port 32. Parallel to the vertical side wall 30 is an opposite side wall 34 and the space therebetween defines the vertical passage by which the horizontally moving stream of seed cotton in air duct 20 is turned downwardly and enters the cleaning chamber 20 through the opening 36 which extends through the top wall 38 of the precleaner casing and into the header 28.

Since the interior of the header extends substantially the entire length of the precleaner casing, in order to distribute the stream of cotton over the entire length of the cleaning rollers, and since the port 32 is located substantially at the mid-point of the vertical wall 30 of the header, it is obvious that the stream of cotton entering the header will flow vertically downwardly in a stream in which the cotton is progressively widened from its upper to its lower portion, as indicated particularly in Figure 4, the downwardly diverging edges of this stream being indicated by the arrows in Figure 4.

During this vertical downward travel of the stream of cotton, it will be observed that the same is widened and is formed into a thinning layer. Also, there tends to be maximum dispersal of the cotton at this point due to its free fall in its vertical descent into the cleaning chamber 22.

In accordance with this invention a moisture injecting means is provided which applies moisture to the seed cotton at this particular location where the most advantageous results can be obtained.

For that purpose there is provided a moisture applying spray nozzle assembly whose construction is best shown in Figure 3. The same includes a manifold or header 40 extending in a substantially parallel relation to the side wall 34 of the header 28, the moisture assembly head 40 having a plurality of spray nozzles 42 carried thereby. These spray nozzles extend through suitable openings or vertically elongated slots in the side wall 34 of the header 28 and are preferably disposed, as shown in Figure 1 in a horizontal plane which lies below the horizontal plane extending through the bottom of the air and seed supply duct 20. The nozzles are directed across the header 28 towards the incoming stream of seed cotton.

Moisture or other cotton treating agent is applied, preferably under pressure to the header 40 from any suitable source, not shown and by the nozzles is directed in a plurality of sprays to cause impingement of the same upon the seed cotton during its vertical descent through the header 28 into the cleaning chamber 22. It will be observed that owing to the widened and thinned layer of seed cotton during such vertical descent, the same is ideally adapted to receive and absorb the moisture and to cause a homogeneous application of the latter to the seed cotton, this particular location offering the most effective and advantageous position at which moisture can be applied to the seed cotton.

The moisture header 40 is preferably mounted by any suitable supporting bearings as at 44 in Figure 1 upon the top wall of the precleaner casing, or upon any other suitable support in such manner that the header may be oscillated or rotated about its longitudinal axis in its bearings 44 in order to vary the vertical inclination of the nozzles 42 in the vertical slots in the wall 34. This vertical motion, as will be apparent from inspection of Figure 1 and Figure 4, will vary the place of impingement of the nozzles upon the descending stream of cotton, and owing to the varying width of the latter, will thus vary the portion of the width of the stream of the cotton which is treated by the moisture from the nozzles. Thus, if the nozzles are raised sufficiently, only a portion of the same will have their spray impinging upon the stream of cotton; while if the nozzles are lowered sufficiently, the spray from the same will not completely cover the entire width of the stream of cotton. By this means the device can be adjusted to vary the position and area of the stream of cotton upon which the moisture is impinged. In addition, such vertical adjustment will also vary the distance of the nozzles from the stream of cotton and thus, to some extent at least, vary the extent of penetration of the stream of cotton by the spray and consequently the proportion of the moistening of the cotton by the sprays.

As a further means for varying and controlling the amount of moisture applied to the cotton, it is contemplated that the pressure applied to the header 40 may be varied in any suitable manner to thus further effect the quantity of moisture and the force with which the same is applied to the seed cotton.

It is within the purview of this invention to provide an automatic pressure regulator upon the header 40, as for example to maintain a uniform 30 lb. pressure therein or any other suitable pressure. Such automatic control is diagrammatically indicated at 46 in Figure 3. However, whenever it is necessary to extinguish a fire occurring in this portion of the seed cotton cleaning and drying equipment, a by-pass conduit 48 is provided around the automatic pressure control valve 46, which by-pass conduit is provided with a control valve 50 which is adapted to be operated from a remote station, by any suitable means, whereby the rate of flow of the moisture and its pressure may be immediately raised to a maximum or to any other desired value to thus substantially flood the seed cotton with moisture and thereby extinguish any fire appearing therein.

It is also within the purview of this invention to regulate the automatic control valve 46 by any suitable means; and particularly to correlate this control valve with the rate of feed of the seed cotton into the cleaning chamber, by any suitable means, not shown.

It should be observed that any moisture not absorbed by the stream of seed cotton upon which the spray from the nozzle assembly directly impinges, will pass with the incoming seed cotton and air to the cleaning chamber 22, and will pass from the stream of seed cotton disposed beneath the cleaning rollers 18 and above the strainer 24. This excess moisture will then be drawn through this last mentioned stream of cotton, further imparting moisture thereto, and the residue of this excess moisture will then be educted with the air discharge from the precleaner through the air discharge duct 52 forming a conventional element of the precleaner.

It will be readily recognized that certain of the principles of this invention are not limited to application to a precleaner, but also may be applied in various other mechanisms in which cotton is passed and handled in a flowing stream of loosely associated particles.

In the preceding embodiment it will be observed that the nozzle means for introducing moisture into the seed cotton upon its discharge through the port 32 into the header 28, was located below the port 32 on the opposite wall 34 of the header and was directed in a horizontal direction towards the falling stream of cotton. It may, however, be desirable from the standpoint of expediency and by reason of mechanical purpose to position the spray nozzle assembly at slightly different locations, while still directing the stream of moisture toward the free flowing seed cotton and for impingement upon the latter during its free fall. A variety of such modified arrangements are shown in Figures 5–7, in all of which the moisture is applied in a similar manner.

Thus, in the modified arrangement of Figure 5, the manifold assembly 40 has its supporting journals 44 secured upon the top wall 33 of the header 28 or upon a supporting bracket 60 extending laterally from the same and if desired upon the side wall 34 of the header. The nozzles 42 of the spray assembly preferably extend through the slots 62 extending transversely of a top wall 33 in such a manner as to direct the spray thereof downwardly and slightly transversely of the header whereby the spray will impinge upon the free falling downward stream of seed cotton as the latter passes into the header. It will, of course, be understood that the spray device may be of the character described in detail in connection with Figures 1–4, and is controllable and adjustable in accordance with the description of that form of the invention.

A still further alternative arrangement of the spray device is shown in Figure 6 wherein the spray nozzles 42 of the assembly which is carried upon the side wall 34 of the header extend through slots 64 formed in the side wall, adjacent the top thereof. In this arrangement the nozzles are disposed in the side wall 34 but are above the inlet port 32 of the duct 20 whereby the spray will be directed downwardly and across the header for impingement upon the free flowing stream of cotton discharged from the port 32.

In the further modification of Figure 7, it will be seen that the spray nozzles 42 are positioned within the upper portion of the chamber 22 and below but adjacent to the discharge port 36 by which the header communicates with the interior of the chamber 22 of the precleaner. The nozzles are directed upwardly and into the header for impingement upon the free flowing seed cotton either within the header, within the chamber 22 or both, this latter position being indicated in Figure 7. As in the preceding embodiments, it is of course possible to provide angular adjustment of the nozzles 42 by rotating the manifold 40 within its supporting journals 44 to thereby vary the angle of the impingement of the moisture upon the cotton.

Although the previously described arrangements of Figures 1–7 are generally preferable, it is also possible to obtain some of the benefits of this invention by applying the moisture to the seed cotton after the latter leaves the precleaner and during its travel toward the gin stands. Thus as in Figure 8, the nozzles 42 carried by the rotatably adjustable manifold or pipe 40 which in turn is mounted in the journals 44, is mounted upon any suitable portion of the framework 70 and adjacent the outlet 26 of the precleaner assembly 10. Indicated at 72 is the seed cotton which upon being discharged from the outlet 26 drops freely or along a chute or apron, not shown, in the relatively thin stream during its passage from the precleaner toward the gin stands. The nozzle assembly is positioned so that the spray from the nozzles 42 may be caused to impinge upon the free falling stream of seed cotton 72, preferably closely adjacent to its emergence from the discharge opening 26. It is of course understood that the nozzles 42 may be adjusted by rotation about the axis of the conduit 40 as in the preceding embodiments whereby to vary the angle of impingement of the spray upon the falling seed cotton; and also the length of travel of the moisture spray from the nozzles 42 to its impingement upon the seed cotton.

The foregoing embodiments all illustrate various advantageous positions and manners in which the moisture may be caused to impinge upon the free falling seed cotton. The common, fundamental and essential principles of this invention, and extending throughout each of the above described modifications, is that the moisture is sprayed upon the seed cotton when the latter is in a relatively thin free falling stream, in which condition the seed cotton is adapted to most efficiently absorb the moisture. Further, the moisture is injected across the stream of air conveying or accompanying the seed cotton, or when it is discharged from the precleaner, which air stream may be relied upon for effectively removing the surplus of moisture or that which is desired to impart into the seed cotton fibers, in order to leave a resultant predetermined total moisture content in the cotton fibers.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A precleaner for seed cotton having an entrance opening into a cleaning chamber adjacent the top thereof, means for conveying seed cotton and air in a relatively narrow stream from a source of supply, means for passing the cotton and air from said stream downwardly in a relatively widening stream and with free fall through the entrance opening and into the cleaning chamber, means for impinging moisture upon said widening stream during said free fall.

2. The combination of claim 1 including means for varying the angle and place of the impingement of the moisture upon the seed cotton during the free fall of the widening stream.

3. The combination of claim 1 wherein said means for impinging moisture directs said moisture across said widening stream and in an upwardly inclined vertical direction.

4. The combination of claim 1 wherein said impinging means directs moisture across the widening stream of seed cotton and in a downwardly inclined direction.

5. The combination of claim 1 including means for varying the distance of travel of the moisture from the impinging means to its impingement upon the widening stream of seed cotton.

6. A precleaner for seed cotton comprising a casing to which seed cotton is delivered from a dryer by a delivery duct, a plurality of cleaning rolls adapted to successively handle seed cotton from said delivery duct for cleaning foreign matter therefrom, said casing having a header communicating therewith and extending longitudinally of the cleaning rollers and into which the discharge port of said duct communicates, a nozzle spray assembly associated with said header for directing a spray of fluid in said header towards the discharge port and across the stream of air and cotton passing through the header from the port to said cleaning rollers.

7. In a seed cotton precleaner, in combination, a header having an opening for delivering seed cotton by gravity fall into a precleaner, said header having a port for receiving seed cotton therein from an air duct, said header comprising a chamber extending from both sides of said port, means in said header for directing a spray of moisture upon a stream of free falling seed cotton passing from said port through said opening.

8. The combination of claim 7 wherein said means for spraying is mounted in said header in opposition to said port and is positioned below said port.

9. A process for dissipating static charges and extinguishing fires in a precleaner for seed cotton comprising moving the seed cotton in a stream towards the cleaning elements of a precleaner, causing the impingement of moisture upon said stream in sufficient quantity to dissipate static and extinguish fires, the movement of the seed cotton in said stream including passing the seed cotton downwardly in a substantially vertical direction, the moisture being moved substantially in a horizontal direction during its impingement upon the vertically moving cotton, said stream of seed cotton in its vertical movement being progressively widened as it descends thereby spreading and thinning the stream, said moisture impingement being across substantially the entire width of the widened and thinned portion of the stream.

10. The process of claim 9 including the step of varying the area and location of the moisture impingement upon the stream.

11. The combination of claim 6 wherein said nozzle spray assembly is disposed in the chamber of the precleaner and projects its spray upwardly into the header and towards said port.

References Cited in the file of this patent

UNITED STATES PATENTS

| | | |
|---|---|---|
| 588,812 | Bessonette | Aug. 24, 1897 |
| 1,520,187 | Lawson | Dec. 23, 1924 |
| 1,533,903 | Rylander | Apr. 14, 1925 |
| 2,019,079 | Herring | Oct. 29, 1935 |
| 2,148,184 | Baker | Feb. 21, 1939 |
| 2,158,752 | Fowler | May 16, 1939 |
| 2,224,625 | Ahrens | Dec. 10, 1940 |